United States Patent
Bailey et al.

(10) Patent No.: US 8,448,421 B2
(45) Date of Patent: May 28, 2013

(54) HC ADSORBER WITH OBD CAPABILITY

(75) Inventors: Owen Herman Bailey, Lake Orion, MI (US); Davion Onuga Clark, Macomb, MI (US); David Henry Moser, Sterling Heights, MI (US)

(73) Assignee: Umicore AG & Co. KG, Hanau-Wolfgang (DE)

( * ) Notice: Subject to any disclaimer, the term of this patent is extended or adjusted under 35 U.S.C. 154(b) by 525 days.

(21) Appl. No.: 12/704,173

(22) Filed: Feb. 11, 2010

(65) Prior Publication Data

US 2011/0192138 A1    Aug. 11, 2011

(51) Int. Cl.
    *F01N 3/00*    (2006.01)

(52) U.S. Cl.
    USPC ............. 60/277; 60/275; 60/285; 60/286; 60/297

(58) Field of Classification Search
    USPC ............. 60/285, 288, 297, 276, 295, 277, 60/286, 275
    See application file for complete search history.

(56) References Cited

U.S. PATENT DOCUMENTS

| | | | |
|---|---|---|---|
| 3,938,377 A | 2/1976 | Converse, II et al. | |
| 5,492,679 A * | 2/1996 | Ament et al. | 422/180 |
| 5,524,433 A | 6/1996 | Adamczyk, Jr. et al. | |
| 5,533,332 A * | 7/1996 | Uchikawa | 60/274 |
| 5,765,369 A | 6/1998 | Tanaka et al. | |
| 5,956,945 A | 9/1999 | Kumar et al. | |
| 5,956,947 A * | 9/1999 | Tanaka et al. | 60/297 |
| 5,996,337 A | 12/1999 | Blosser et al. | |
| 6,145,304 A | 11/2000 | Takahashi et al. | |
| 6,185,933 B1 * | 2/2001 | Tsuzuki et al. | 60/285 |
| 6,216,450 B1 | 4/2001 | Takahashi et al. | |
| 6,286,306 B1 * | 9/2001 | Takakura et al. | 60/288 |
| 6,357,224 B1 | 3/2002 | Kawamoto et al. | |
| 6,378,298 B2 | 4/2002 | Harima et al. | |
| 6,502,388 B2 | 1/2003 | Takaku et al. | |
| 6,502,389 B2 * | 1/2003 | Katayama et al. | 60/285 |
| 6,532,793 B1 | 3/2003 | Palocz-Andresen | |
| 6,797,517 B1 * | 9/2004 | Hoshi et al. | 436/37 |
| 7,240,479 B1 * | 7/2007 | Fujimoto | 60/277 |
| 7,513,104 B2 * | 4/2009 | Takatsuto et al. | 60/277 |
| 2006/0101808 A1 | 5/2006 | Nakagawa et al. | |
| 2006/0236678 A1 * | 10/2006 | Tanada et al. | 60/277 |
| 2007/0051094 A1 | 3/2007 | Tanada | |
| 2008/0168824 A1 | 7/2008 | Yezerets et al. | |

FOREIGN PATENT DOCUMENTS

| | | |
|---|---|---|
| JP | 6-66131 | 3/1994 |
| JP | 2000-8838 | 1/2000 |
| JP | 2002-89242 | 3/2002 |

* cited by examiner

*Primary Examiner* — Thomas Denion
*Assistant Examiner* — Anthony Ayala Delgado
(74) *Attorney, Agent, or Firm* — Smith, Gambrell & Russell, LLP

(57) ABSTRACT

A device and process for storing hydrocarbons as part of an exhaust emission control system and diagnosing the state of said device based on the incorporation of reactive metal species within the porous microstructure of the associated hydrocarbon adsorbent.

8 Claims, 8 Drawing Sheets

In-line Configuration

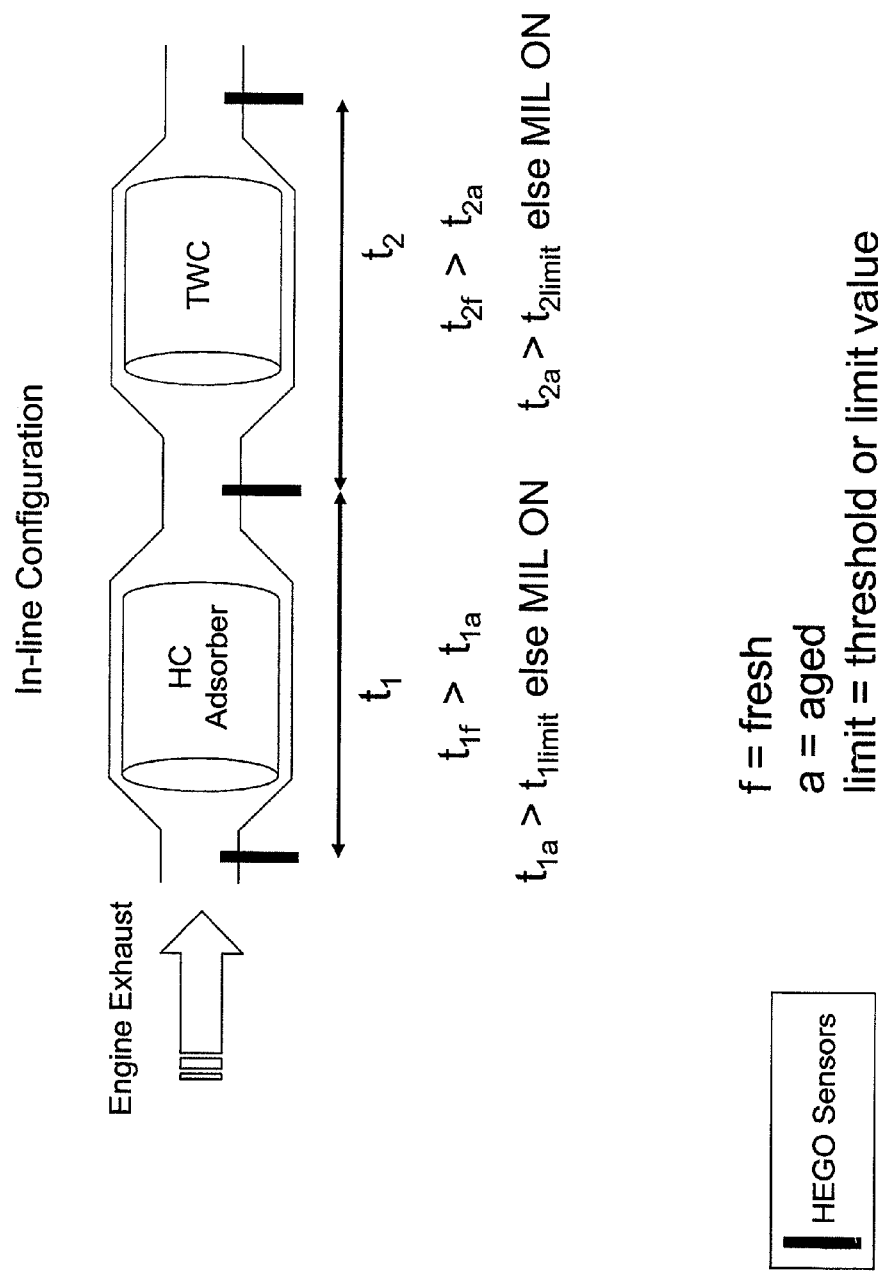

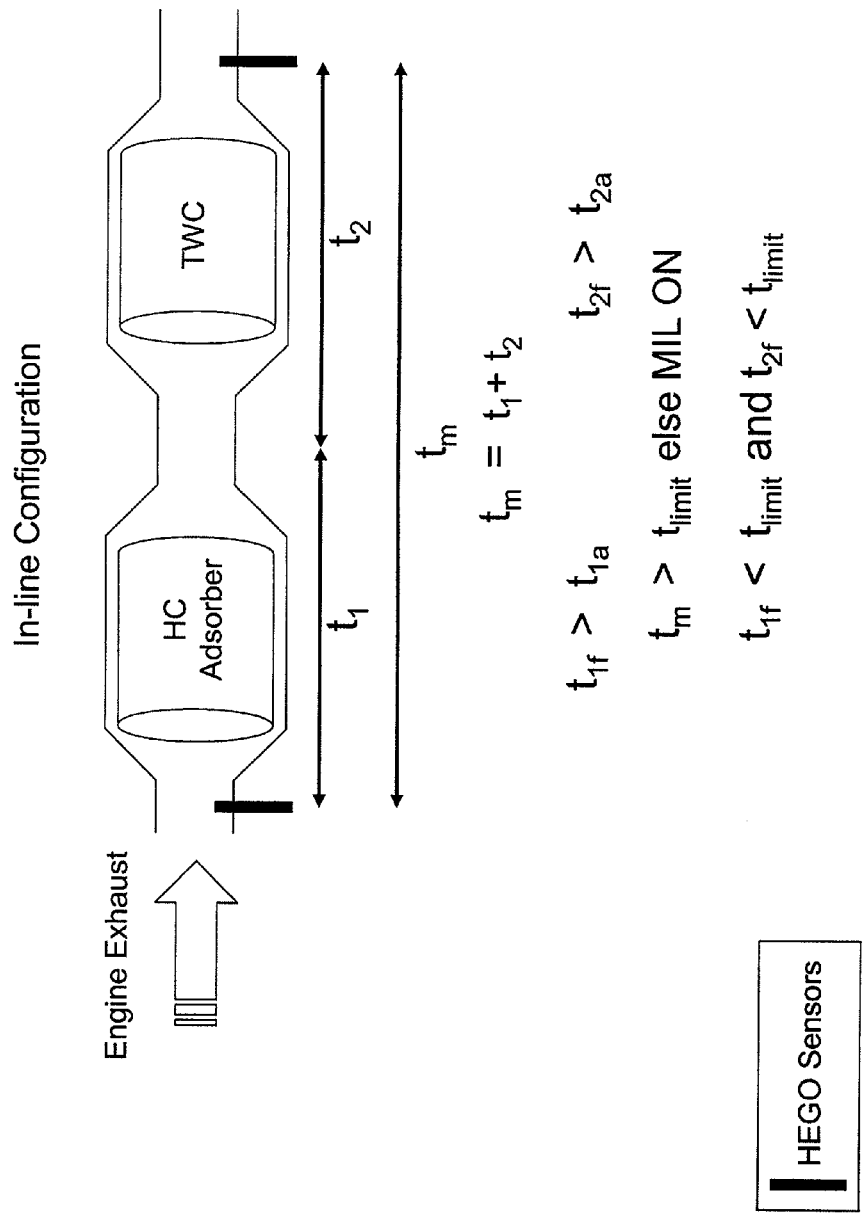

Off-line Configurations

Off-line Configurations

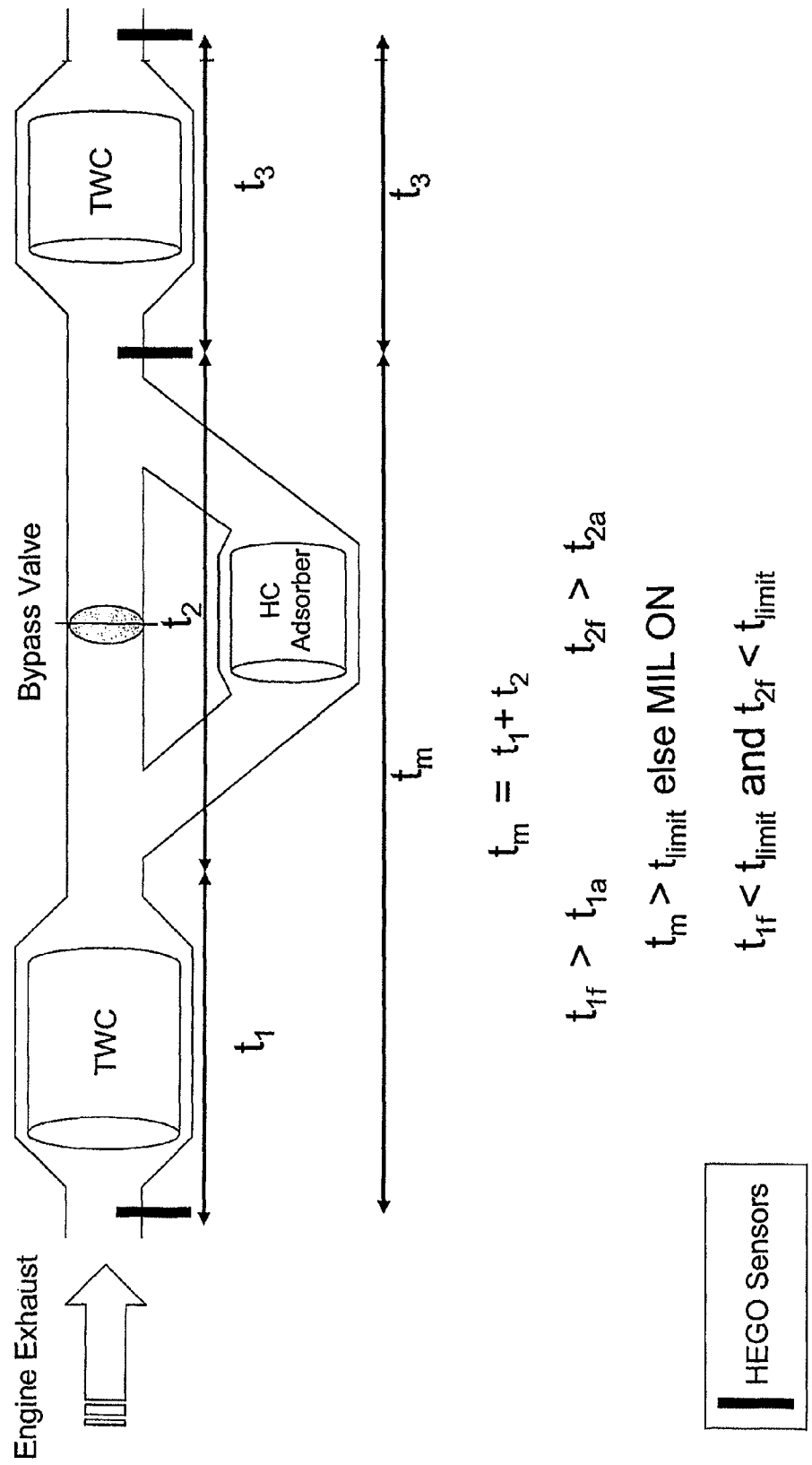

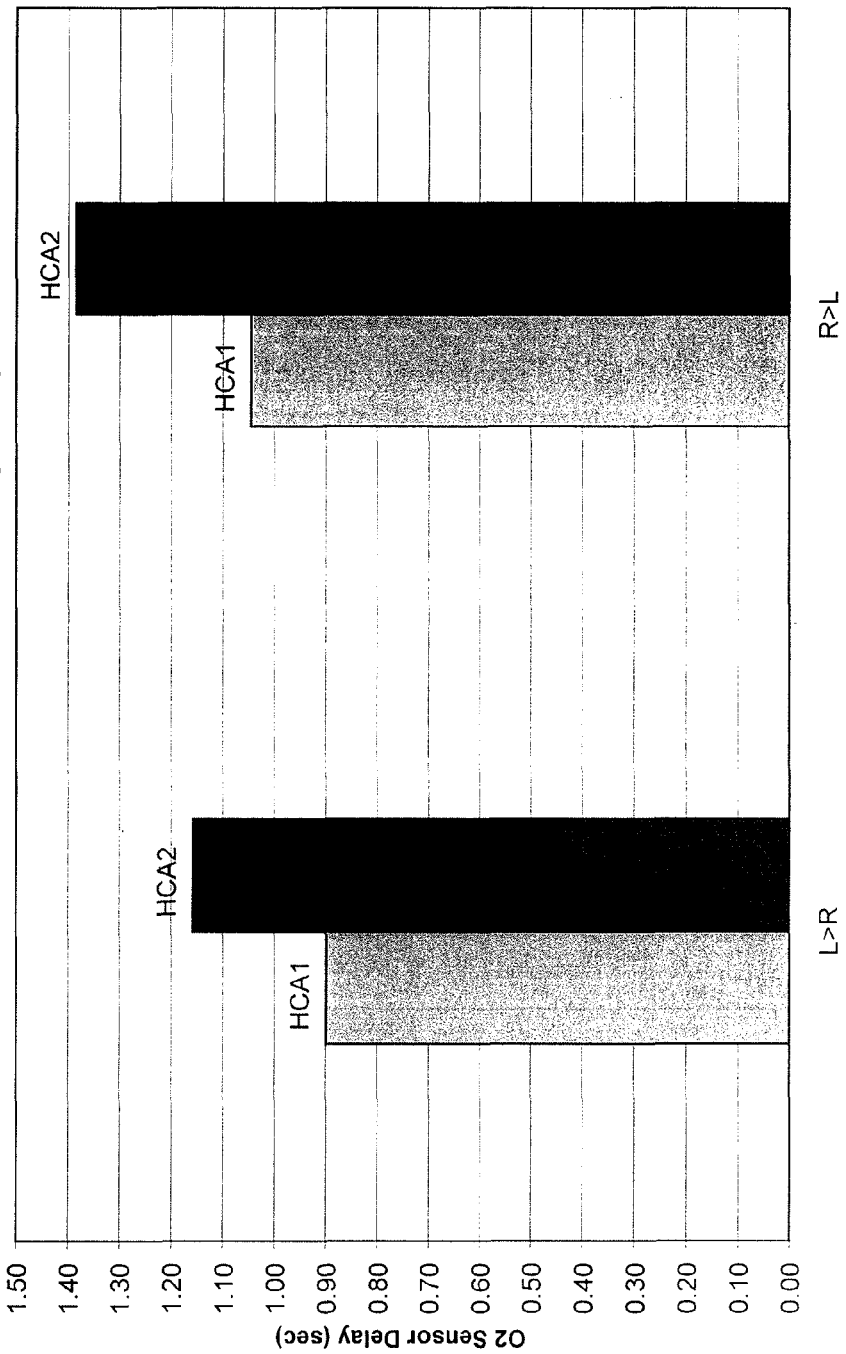

HC ADSORBER WITH OBD CAPABILITY

INTRODUCTION AND BACKGROUND

Engine exhaust emission control regulations are becoming increasingly demanding throughout the world. In addition to lowering permissible emission levels for hydrocarbons (HC), carbon monoxide (CO), nitrogen oxides (NOx), and particulate matter (PM), on-board measures for diagnosing the operability of emission-related engine operations and aftertreatment devices have been mandated for both spark and compression ignition engines. While advances in engine designs have helped minimize pollutant generation within the combustion process, improvements in catalyst performance such as in light-off and thermal durability have aided in the lowering of tailpipe emission levels.

As a result, in most cases the most significant breakthrough of regulated emissions to the atmosphere occurs during the period when the emission catalysts are warming to temperatures where efficient conversion can take place. Developers of future system designs which will employ the most sophisticated engine controls to facilitate catalyst heat-up are searching for additional measures to further reduce emissions during what has come to be known as the cold start of the engine.

One measure for addressing HC emissions during cold start is by employing an exhaust aftertreatment component referred to as a hydrocarbon adsorber. HC adsorbers are devices which are designed to remove hydrocarbon molecules from a relatively cool exhaust stream, at a temperature below the light-off temperature of oxidation catalysts, and trap or store the HC until the exhaust gas temperature rises to a point where downstream catalytic sites are active. With the increasing use of alcohols in engine fuels, and specifically with an increase in the ethanol content of many fuels targeted for use with conventional gasoline fueled engines, the emission of alcohols and the products generated from the partial combustion of alcohols is becoming a more important problem during engine cold start as well. The devices known as HC adsorbers can also be effective for the storage of alcohols and other oxygenates during cold start. For this reason, in the description below, when the term HC is utilized it should be understood that related phenomena associated with oxygenates apply, and the scope of the invention includes the treatment of such species as well.

Many high surface area materials such as the support oxides commonly used in exhaust catalysts are capable of storing some HC at low temperatures which can subsequently be released as the exhaust gas temperature increases. Even the porous ceramic substrates composed of cordierite or mullite have some capacity for low temperature HC storage. It has become known, however, that highly porous structures like the crystalline microporous silica-aluminas, also known as molecular sieves or zeolites, and related structural compositions, are able to store significant quantities of HC at low temperatures, and because of the strong physical interaction between the HC molecules and these materials, the onset of HC desorption occurs at higher temperatures. This, in turn, allows the associated downstream catalytic sites to heat up to higher temperatures and thereby increases the overall HC conversion efficiency of the system.

There are a wide variety of molecular sieve materials which may be particularly useful as HC adsorbents. These include aluminosilcate zeolites, metal-substituted aluminosilicate zeolites, and aluminophosphate materials which include AlPO, MeAlPO, SAPO, and MeAPSO compositions. Additionally, materials comprising a range of crystallographic structures with Framework Type Codes consisting of BEA, FAU, MOR, MFI, FER, and CHA, among others. A key attribute to any of these is the presence of sufficient thermal durability to withstand the needs of the specific configuration's most severe exhaust temperature.

Because the types of HC or oxygenate molecules in engine exhaust range from single carbon species up to molecules with 8 carbon atoms and more, effective HC adsorbents must have the ability to capture a broad range of species ranging in physical size, shape, and volatility. While molecular sieves with larger pore and channel sizes such as those possessing the BEA, MOR, and FAU structures can easily accommodate larger molecules such as substituted benzenes, toluene, pentane, and hexane within their internal structures, thereby facilitating the storage of these molecules and delaying their release during the heat-up process accompanying cold start, smaller molecules such as ethane, propane, and ethanol are released from these structures at temperatures below their light-off temperatures over typical precious metal catalysts. As a result, larger pore molecular sieves when applied by themselves may be inadequate for the purpose of HC control during cold start. On the other hand, molecular sieves with smaller pore sizes such as those possessing the FER and CHA structures, while unable to accommodate larger HC and oxygenate molecules within their internal structures, are able to capture and store smaller molecules, thereby facilitating their combustion over sufficiently heated precious metal sites at a later stage in the heat-up process associated with engine cold start. Because of these differences in storage and release properties, mixtures of molecular sieve materials can be used advantageously within a HC adsorber formulation.

The simplest HC adsorbers comprise an HC storage component (adsorbent) such as a zeolitic material, a "honeycomb" ceramic or metallic substrate, and a binder to promote adhesion of the adsorbent to the substrate. Binders are well known in the art and any suitable binder can be used for purposes of the present invention. As with related exhaust emission catalysts, coated ceramic substrates are incorporated into a metal container, referred to as a converter, with an inlet and outlet allowing exhaust gas to be directed through the channels of the coated substrate.

As noted before, the fundamental principle of adsorber operation is low temperature HC storage and its subsequent thermal desorption and oxidation at an elevated temperature over downstream catalytic sites. In practice, these downstream sites may be located on a separate and distinct catalyzed substrate, or even within a separate, downstream catalytic converter.

More complex formulations for HC adsorbers are also well established in the art where the concept of downstream site may be extrapolated to adjacent catalytic site. In addition to the HC adsorbent, components with catalytic activity for HC and CO oxidation and NOx reduction, as well as materials with oxygen storage capacity (OSC), may be incorporated within the same device. Each of these components is well known for their contribution to the activity of state-of-the-art three-way catalysts (TWC). Catalytic components include precious metals such as platinum, palladium, and rhodium, typically supported on alumina or other metal oxides. Standard OSC components include materials comprising oxides of cerium and its combinations with zirconium, yttrium, neodymium, praseodymium, and lanthanum, among others. Architectured structures comprising layers of HC adsorbent and TWC supported on honeycomb substrates have also been utilized commercially as HC adsorbers.

In addition to variations in HC adsorber formulation, systems have also been employed on production vehicles in two distinct configurations, so called in-line and off-line designs.

Examples of these configurations are shown in FIG. 1 and FIGS. 2, 2A and 2B. The in-line configuration offers advantages in cost and packaging, however, it also requires the HC adsorber to maintain performance following exposure to high temperature exhaust. The off-line system adds the complexity of a valved exhaust, but minimizes exposure of the adsorbent to elevated temperatures, while providing a mechanism by which HC can be isolated in an off-line adsorbent as a downstream catalyst is allowed to heat up to a more efficient operating temperature before the trapped HC is released for oxidation.

One of the challenges associated with the implementation of the in-line HC adsorber configuration is the degradation of the HC adsorbent upon exposure of the device to elevated exhaust temperatures which are common to operation of spark ignited engines under conditions of high load. As the adsorbent ages thermally, its surface area decreases. This can occur through conventional sintering processes, including the collapse of the crystalline microporous structures of molecular sieves and related materials. With the loss of surface area and associated porosity, the ability of the HC adsorber to perform its designed HC storage function is diminished, resulting in a decrease in the amount of HC which can be stored, as well as a lowering in the temperature range at which stored HC is thermally released from the adsorbent. In parallel, hydrothermal degradation of catalytic activity located either within the HC adsorber itself, or within a downstream catalyst can result in an increase in light-off for the oxidation of HC, as well as a loss in peak HC conversion efficiency. The combination of decrease in HC storage capacity, lowering of HC desorption temperature, and increase in HC oxidation light-off temperature results in an increase in unconverted HC being exhausted at the tailpipe during subsequent engine cold starts. Ultimately this decrease in system HC conversion efficiency can lead to a failure to meet legislated tailpipe emission levels.

Because of the system configuration, all exhaust flow passes through the in-line HC adsorber, regardless of the exhaust temperature. Upon prolonged exposure to exhaust flow at engine idle and other engine operating conditions where low exhaust temperatures persist, the HC adsorbent can accumulate HC which can subsequently transform by chemical reaction into tars, coke, and other compositions. These deposits can cover the adsorbent surface and foul its associated porosity. In this state the ability of the adsorbent to carry out its designed HC storage function is diminished which could ultimately result in unconverted HC being exhausted at the tailpipe. The activity of a fouled HC adsorber can be at least partially recovered by exposing the device to an exhaust flow of sufficient temperature. Often the process is more effective in the presence of oxygen such that the fouling deposits are combusted. Importantly, this process is exothermic and measures must be taken to limit the combustion rate during the "burn-out" process so that thermal damage of the adsorbent and any associated catalyst is minimized.

Because similar formulations can be utilized for different HC adsorber configurations, performance degradation mechanisms for off-line HC adsorbers are similar to those for in-line HC adsorbers. As noted previously, however, the off-line adsorber can be isolated and protected from the effects of high temperature exhaust.

A requirement of many automotive emission control systems is the capability to diagnose component and system changes which can result in the failure of the emission control system, and its associated vehicle or equipment, to comply with regulated exhaust emission levels. This general type of monitoring is referred to as an on-board diagnostic or OBD. Over the years, the requirements for OBD have expanded to include a range of engine-based components and emission catalysts.

For conventional TWCs, the development and incorporation of oxygen storage materials to meet the performance requirements of these types of catalytic components is well known. In this context, oxygen storage materials chemically react with oxygen present in the exhaust gas coming in contact with the catalyst when the oxygen storage material is at a sufficiently high temperature to render it active. The extent or amount of oxygen that reacts with the oxygen storage material is generally referred to as its oxygen storage capacity (OSC). OSC is known to vary with a number of properties including temperature, material composition, and state of aging. The response of an OSC material can be altered by the presence and absence of precious metals which often facilitate oxygen transfer reactions. Precious metals themselves, as well as certain base metals (Cu, Mn, Ni, Fe, Co, Cr, Mo, W, Ce, and V, among others) and their oxides, typically have an associated oxygen storage capacity of their own.

The oxygen storage property imparted by ceria and ceria-based mixed oxides often serves as the basis of an onboard diagnosis (OBD) signal which is utilized to assess the state of an emission catalyst, and through appropriate correlation, establish whether the catalyst is effective in meeting its application-specific performance requirements. The measurement of OSC is typically accomplished using a set of oxygen sensors, in conjunction with control of engine air-to-fuel ratio and catalyst temperature, and knowledge of exhaust flow rate through the system.

A simple switching time test consists of passing a fuel rich exhaust across the first oxygen sensor, through the test catalyst, and finally across the second oxygen sensor. Upon maintaining this flow for sufficient duration at sufficient temperature, any oxygen stored within the OSC of the catalyst will react completely away and signals from the first and second oxygen sensors will become equivalent and indicative of a fuel rich exhaust state. Once accomplished, the composition of the exhaust is adjusted in a stepped change from fuel rich to fuel lean (and oxygen rich). As the fuel lean exhaust passes across the first sensor, the signal of the first sensor responds to the step change in exhaust composition corresponding to the lean state. Because oxygen in the fuel lean exhaust is consumed by reaction with the oxygen storage material in the catalyst, it is only upon saturation of the catalyst OSC that fuel lean exhaust containing oxygen passes across the second sensor, ultimately yielding a signal indicative of the lean state at this sensor. The elapsed time between the sensing of the lean condition at the first and second sensors minus the time required for exhaust gas to flow from the first to second sensor is commonly referred to as the delay time. Similar although not identical behavior is observed whether the exhaust composition is switched from rich to lean or lean to rich. The corresponding delay times are characteristic of the OSC and state of the catalyst.

More complex measurements related to the response of oxygen storage materials in emission catalysts to changes in exhaust gas oxygen content can be made and used to assess catalyst state, and ultimately correlate it to one or more aspects of associated emission control performance. For OBD purposes, most often the correlation has been associated with TWC HC emission performance. Importantly, this correlation is with the catalytic activity for the reaction of HC.

Key to any OBD method based on oxygen storage capacity is a fast and reliable determination of exhaust gas composition. Measurements such as delay time tests can be accomplished without an exact measurement of oxygen concentration. It is well known in the art that simple heated exhaust gas oxygen (HEGO) sensors which are highly non-linear and only able to differentiate fuel rich or fuel lean exhaust compositions are sufficient for these types of measurements. Importantly, HEGO sensors are known to be both reliable and inexpensive.

In recent years, more sophisticated engine control strategies have dictated the introduction of universal exhaust gas oxygen (UEGO) sensors. UEGO sensors provide signals which are proportional to air to fuel ratio. As a result, oxygen concentrations can be estimated directly and monitored continuously. Unfortunately, UEGO sensors are more susceptible to drift than their HEGO counterparts, as well as more expensive.

Thermocouples or thermistors have been successfully applied for the OBD of diesel oxidation catalysts which provide HC emission control, but also serve as a heat-up catalyst for the combustion cleaning of particulate filters, or for a similar role in the desulfurization of NOx adsorber catalysts. In these cases, because large exotherms are routinely generated across these catalysts, temperature measurement is sufficiently accurate to be an effective signal for OBD.

At the present time, the direct, fast, and continuous measurement of hydrocarbons for engine control and system diagnostic purposes has not been introduced for mass production vehicles. Technologies capable of these measurements are typically either too large for vehicle packaging, or simply too expensive. As a result, HC performance of vehicle emission catalysts continues to be inferred rather than directly measured for OBD purposes.

As noted previously, a variety of HC adsorber designs exist, some of which store and release HC, others which additionally react with HC. As a result, the successful monitoring of these functions for OBD purposes must account for these differences. U.S. Pat. No. 5,524,433 claims the effective monitoring of hydrocarbon trapping devices by the combination of exhaust flow sensing and HC concentration determination. During a storage and release sequence in a bypass HC adsorber system, the aggregate amount of HC removed from the exhaust during start-up conditions could be determined directly with a set of HC sensors, or indirectly using a set of UEGO sensors. In either case, the sensors are positioned upstream and downstream of the HC adsorber and difference determinations made. The approach has the advantage of direct measurement, however, it comes at the cost of incorporating a pair of expensive sensors.

U.S. Pat. No. 5,765,369 teaches a similar approach for monitoring the effectiveness of a bypass HC adsorber system. Here the measurement of a physical value in the exhaust gas which could be compared to a predetermined physical value is claimed, where said physical value includes gas temperature and toxic component concentration. Again, control and monitoring of the exhaust purification system is complicated and expensive because of the need to make accurate difference determinations.

Similar approaches are claimed in U.S. Pat. No. 6,145,304 where the measurement of air-fuel ratio is specified, and in U.S. Pat. No. 6,532,793 where the detection of at least one gas substance selected from the group consisting of hydrocarbons, carbon monoxide, and nitrogen oxides is specified.

A different approach for controlling and diagnosing the operation of a bypass hydrocarbon adsorber system is claimed in U.S. Pat. No. 6,378,298. In this system, exhaust gas feeding the adsorber bed is cooled. Temperature sensors provide a signal used to control flow through the adsorbent, and a signal from a pressure sensor is used to confirm that appropriate flow through the adsorbent bed occurs. Again, however, signals from a set of air/fuel sensors are utilized to determine the effectiveness of the adsorbent by difference calculation as proposed in U.S. Pat. No. 5,524,433.

US 2007/0051094 A1 discloses an HC adsorbing material based on Ce exchanged zeolite which exhibits no OSC signal. This is attributed to the ionic state of the Ce. An OSC signal develops when the zeolite structure collapses, Ce is released, and bulk $CeO_2$ forms. This method is capable of detecting a catastrophic failure of the zeolitic structure which results in an associated loss of HC storage capacity. Conversely, it is unable to detect the loss of HC storage capacity associated with the reversible fouling of the zeolite pores.

The challenge associated with OBD in combination with all HC adsorber systems is that up to now there has been no means of determining whether the adsorbent of a system is able to efficiently store hydrocarbons without having a method for determining the quantity of HC stored over a period of time under transient operating conditions, the latter requiring a combination of expensive sensors and a complex means of integrating the HC-correlated response.

SUMMARY OF THE INVENTION

The diagnosing of HC functionality in conventional gasoline TWC catalysts has typically been accomplished indirectly by measuring the oxygen storage capacity (OSC) of the catalyst or catalyst system and developing some type of correlation with HC performance. In the case of HC adsorbers, because HC is generally stored within the pores of molecular sieves (often zeolites), incorporation of OSC materials within the washcoat (external to the porous sieve structure) may not properly reflect the loss of porosity, and as a result, the corresponding loss of HC storage capacity with aging and fouling of a component. By incorporating appropriate metal species within the porous sieve structure serving as the HC storage component of a HC adsorber, changes in pore structure accessibility which would reflect losses in HC storage capacity can be diagnosed using a procedure analogous to that currently used for the OBD of conventional TWCs, such as measuring changes in controlled lean/rich switching times between a set of oxygen sensors.

The present invention therefore relates to a system or method for diagnosing the state of a device for storing hydrocarbons in an exhaust emission control system comprising providing a molecular sieve containing a plurality of micropores in an exhaust gas conduit, the molecular sieve having been modified by the incorporation of one or more reactive base metals within the micropores; passing exhaust gas in contact with the molecular sieve; determining the extent of the hydrocarbon storage capacity by measuring changes in controlled lean/rich switching times between a set of oxygen sensors located in the exhaust emission control system; comparing measured switching time with a predetermined switching time corresponding to minimally required hydrocarbon storage capacity; if the measured switching time is less than the predetermined switching time, initiating a trouble signal such as illumination of a malfunction indicating light (MIL), message or audible signal or alternatively, triggering a series of engine controls comprising raising exhaust temperature and adjusting air/fuel ratio to facilitate the combustion or decomposition of deposits which may be limiting diffusion of gaseous species within the microporosity of the hydrocarbon adsorbent; repeating the switching time measurement to confirm the effectiveness of the restoration of poisoned or fouled hydrocarbon storage capacity; if shown effective, returning the engine to normal operating state; or if ineffective, initiating a trouble signal which comprises the illumination of an MIL light, message or audible signal.

BRIEF DESCRIPTION OF THE DRAWINGS

FIGS. 1A and 1B illustrate the placement of HEGO sensors in an in-line HC adsorber system for the purpose of diagnosing operability according to the invention;

FIGS. 2A, 2B, and 2C illustrate the placement of HEGO sensors in an off-line HC adsorber system for the purpose of diagnosing operability according to the invention;

FIG. 3 is a bar graph showing the average of ten switch times for two different technologies in both the lean-to-rich and the rich-to-lean directions.

DETAILED EMBODIMENTS OF INVENTION

Figure 1:
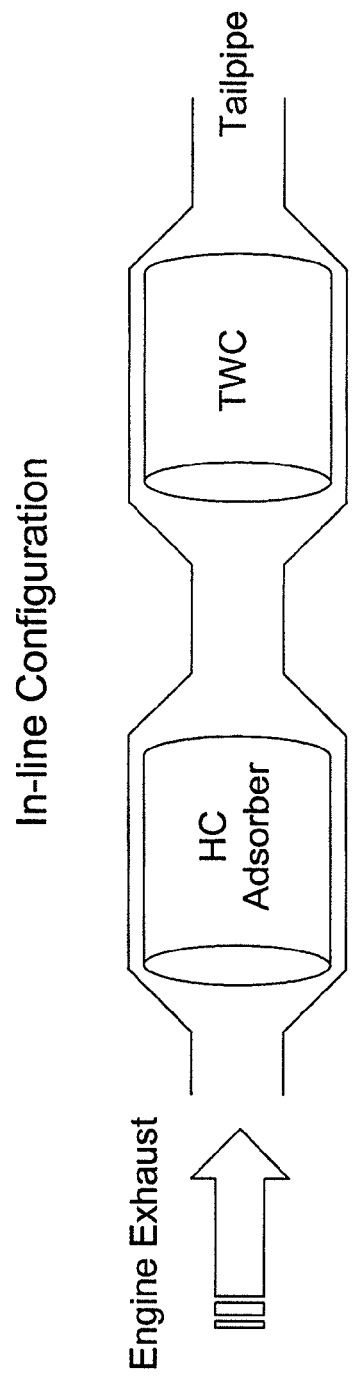
FIG. 1 illustrates a component configuration for an in-line HC adsorber application which can be used according to the invention.

The ion exchange of molecular sieves, also known as zeolites, with metal cations is well known for a variety of emission control catalysts, including SCR and HC-DeNOx catalysts. This type of process deposits cations within the internal pore structure of these materials. Often within catalytic cycles these metals change oxidation state to support chemical transformations. Oxygen, CO, and many hydrocarbons, alcohols, and related oxygenates are small enough molecules to easily diffuse into the pore structure of molecular sieves and related materials with microporous structures. As a result, oxidation or combustion reactions can be supported within these structures.

In the presence of oxygen, many exchanged metals within the structure also become oxidized. The rate and extent of their oxidation is temperature dependent. As a result, an appropriate metal exchanged zeolite exposed to an exhaust gas composition where oxygen is present in excess of the stoichiometric quantity required for complete combustion of a reductant (fuel) will result in oxidation of the exchanged metal. Upon subsequent exposure to excess fuel, the oxidized metals would react with the fuel and become reduced.

The cyclic oxidation and reduction of metal exchanged zeolites upon alternating exposure to oxidizing and reducing conditions is similar in nature to the cyclic oxidation and reduction of conventional oxygen storage materials used in TWCs for the purpose of diagnosing the state of its HC oxidation function. In the case of the TWC, the OSC is a bulk component incorporated within the catalyst matrix.

If a zeolitic material is additionally incorporated into the TWC formulation already containing an OSC material for the purpose of HC storage, exhaust compositions containing HC species would contact both OSC and zeolite as diffusional transport conducts the exhaust composition throughout the matrix. If the HC molecules are small enough in size to enter the pores of the zeolite, diffusion will also facilitate the transport of those molecules into the microporosity of zeolite resulting in the phenomenon characterized as HC storage.

Because many zeolitic materials also have the ability to catalyze the chemical transformation of HC molecules and other species, under certain conditions where exhaust temperatures are sufficient, and the residence time of the species is sufficient, transformations can take place which may cause deposits to form on either the internal or external surfaces of the zeolite, or both. This process is sometimes characterized as coking, sooting, or fouling of the zeolite. Because these deposits can either fill or block the pores of the zeolite, diffusional transport into the zeolitic structure is diminished. As a result, the HC storage capacity of such a fouled material is reduced. This reduction in HC storage capacity can in turn result in a failure of the associated vehicle (or engine or equipment) and emission control system incorporating the HC adsorbent to meet its regulated emission levels. This represents a failure mode for a HC adsorber which can be independent of a thermal degradation mechanism which is often the principal failure mode of emission control catalysts. It also represents a failure mode which will not correlate with the traditional bulk incorporation of OSC materials into a catalyst which is typically utilized to characterize or diagnose by correlation the failure of TWCs. This does not rule out the potential collapse of zeolite pores resulting from thermal degradation which could also result in a loss of HC storage capacity.

By incorporating appropriate metal cations within the zeolitic structure, it is possible to assess changes in pore structure accessibility which would reflect losses in HC storage capacity (i.e. the fouling of the zeolitic pore structure). This diagnostic process is analogous to that currently used for the OBD of TWCs, which is typically accomplished by measuring changes in controlled lean/rich switching times between a set of oxygen sensors.

Upon fouling or collapse of a zeolitic structure, access of either oxidant or reductant molecules to the zeolite-incorporated metal cations will become limited. This means that the rate at which the incorporated metal cations can become reduced or oxidized during a standard lean/rich switching time diagnostic procedure will change significantly. In other words, because the time required for oxygen (or other oxidants) to diffuse into the fouled or collapsed zeolitic structure and react with (oxidize) the incorporated metal cations takes longer than in the unfouled or uncollapsed state, the increase in oxygen concentration in the lean diagnostic exhaust composition will conduct through the HC adsorber more quickly and be detected sooner by a downstream oxygen sensor. For a rich-to-lean switching time diagnostic, this would result in a lowering of the characteristic switch time for a fouled or collapsed HC adsorbent relative to that of an unfouled or properly functioning HC adsorbent. As a result, this failure can be diagnosed. Alternatively, for a lean-to-rich switching time diagnostic, the time required for reductant to diffuse into the fouled or collapsed zeolitic structure and react with (reduce) the incorporated metal cations takes longer than in the unfouled or uncollapsed state, the increase in reductant concentration corresponding to the rich exhaust gas composition during the rich diagnostic composition will conduct through the HC adsorber more quickly and be detected sooner by a downstream oxygen sensor. For a lean-to-rich switching time diagnostic, this would result in a lowering of the characteristic switch time for a fouled or collapsed HC adsorbent relative to that of an unfouled or properly functioning HC adsorbent. As a result, the failure can be diagnosed.

FIG. 1 illustrates the simplest configuration for an in-line HC adsorber system consisting of HC adsorber followed by a TWC. HC is stored at low temperature within the porosity of the HC adsorber. Upon heating, the HC stored within the adsorber is gradually released, however, if the release is delayed for a period of time such that the downstream TWC becomes heated to a temperature where it can facilitate reactive conversion of the HC, the release of HC from the tailpipe to the atmosphere can be diminished.

FIG. 1A illustrates the same in-line HC adsorber system with inclusion of HEGO sensors to be used for diagnosis and feedback control of the emission control system. In this case, three sensors ($H_1$, $H_2$, and $H_3$) are utilized for this purpose.

In conventional emission system applications, conventional oxygen storage materials present within the HC adsorber and TWC react with and consume oxygen when the exhaust gas at their respective inlets is lean, and at sufficiently high temperatures and appropriate flow rates for chemical reaction. This stored oxygen is subsequently available for reaction with reducing species such as HC and CO present in fuel rich exhaust gas compositions. If the HC adsorber and TWC are first exposed to a fuel rich exhaust gas composition for a sufficiently long period, sensors $H_1$, $H_2$, and $H_3$ would generate signals indicative of the presence of a rich exhaust gas composition at each sensor location. Upon a change in exhaust gas to a lean composition, the lean exhaust state would first be sensed at $H_1$. In the absence of any OSC materials in the HC adsorber and TWC, the time delay between the sensing of the lean condition in the exhaust flow at $H_2$ and $H_3$ would correspond to the time required for exhaust gas to flow through the system. In the presence of OSC components within the HC adsorber and TWC, an additional time delay would be introduced corresponding to the consumption of stored oxygen by reaction with the reducing species in the rich exhaust. The delay time, $t_1$, corresponds to the time period between the sensing of the rich condition at $H_1$ and $H_2$. The delay time, $t_2$, corresponds to the period between the sensing of the rich condition at $H_2$ and $H_3$. It is well established that these delay times are related to the quantity of OSC material in the associated catalyst formulation, the volume of the catalyst, and just as importantly, the condition of the catalyst. The thermal aging and poisoning of OSC-containing formulations results in a lowering of the total oxygen storage capacity, as well as the rate at which oxygen reacts with the OSC material, at a given reaction condition (temperature and flow). The net result is a decrease in the corresponding time delay between the sensing of a lean composition as it progresses through the aged or poisoned emission control system ($t_{1f}$ and $t_{2f}$) relative to that of a fresh (unaged or unpoisoned) system ($t_{1a}$ and $t_{2a}$). Similar effects can be obtained for the controlled switching from rich-to-lean or lean-to-rich conditions. For the purpose of diagnosing the state of an emission control system, an appropriate operating condition or series of operating conditions is defined which generate specified exhaust flows and catalyst temperatures at which time delays can be measured. The measured time delays ($t_1$ and $t_2$) are then compared with the time delays ($t_{1limit}$ and $t_{2limit}$) which correspond to the performance of parts which just meet the threshold or acceptable limit of HC performance for the specific application.

In the HC adsorber devices of this invention, the methodology associated with diagnosis of the HC adsorber and related emission control system are analogous to conventional methods. This has the positive attribute that existing HEGO sensors and generally established approaches incorporated within engine control units can easily be adapted to take advantages of this invented HC adsorber and its process for diagnosis. The key difference in the device and diagnosis of the in-line configuration illustrated in FIG. 1A is the incorporation of the functionality which corresponds to the oxygen storage capacity in conventional approaches within the microporous structure in which HC is stored by the incorporation of reactive metal species within the microporous structure itself rather than as a material incorporated within the catalyst matrix but external to the microporous structure.

When in the fresh state, the diagnosis of the condition of the invented HC storage device parallels that of conventional materials. After establishing the appropriate exhaust flow and HC adsorber temperature for the measurement of rich-to-lean or lean-to-rich switching times, the measured delay time ($t_1$) is compared to that of the appropriate limit part ($t_{1limit}$) for the emission control system. In the fresh state, $t_{1f}$ is greater that $t_{1limit}$ because oxygen and other reactive species easily diffuse in and out of the microporous structure of the HC adsorbent. Importantly, if the HC adsorber is exposed to prolonged operating conditions which result in the fouling of the microporous structure, the diffusion of these species will become reduced which will result in measurement of a delay time, $t_1$, which is greater that $t_{1limit}$. As a result, a MIL light or other signal could be activated.

A key element of the fouling of a HC adsorbent is the reversibility of such a process as opposed to a thermal degradation mechanism which is typically irreversible. As a result of this, and as a result of the incorporation of the OSC-type functionality within the microporous system, the control strategy can incorporate an automatic procedure for heating up the adsorber to initiate a special purge of the HC adsorbent designed to remove the deposits which are fouling the zeolitic-type material and lowering its HC storage capacity. This special purge could be accomplished under lean conditions where excess oxygen could support the combustion of the deposits. Alternatively, high temperatures alone may be sufficient to pyrolyze certain type of deposits depending upon their nature which in turn is dependent upon the engine and vehicle or equipment operation. Following completion of the special purge, remeasurement of delay time and comparison with the limiting delay is repeated. If an acceptable delay time is obtained ($t_1 > t_{1limit}$), the system is returned to normal operating state. If an unacceptable delay time is obtained ($t_1 < t_{1limit}$), the MIL is activated indicating the system requires service. In the case of a collapsed zeolitic structure, the special purge would be ineffective, thereby allowing a differentiation of a fouling-based failure from a failure associated with thermal collapse. With this capability, unnecessary service and the associated cost associated with this service would be avoided. As with conventional in-line HC adsorber systems, in order to reduce the number of sensors required to perform system diagnosis for in-line systems incorporating the HC adsorber device of this invention, the control strategy can be based on a delay time ($t_m$) which is effectively the sum of the individual HC adsorber and TWC component time delays ($t_1 + t_2$). With this approach an additional requirement arises to address the potential for one of the devices to be missing. This is addressed if each of the individual fresh time delays is less than the threshold delay ($t_{1f} < t_{1limit}$ and $t_{2f} < t_{limit}$).

Figure 2:
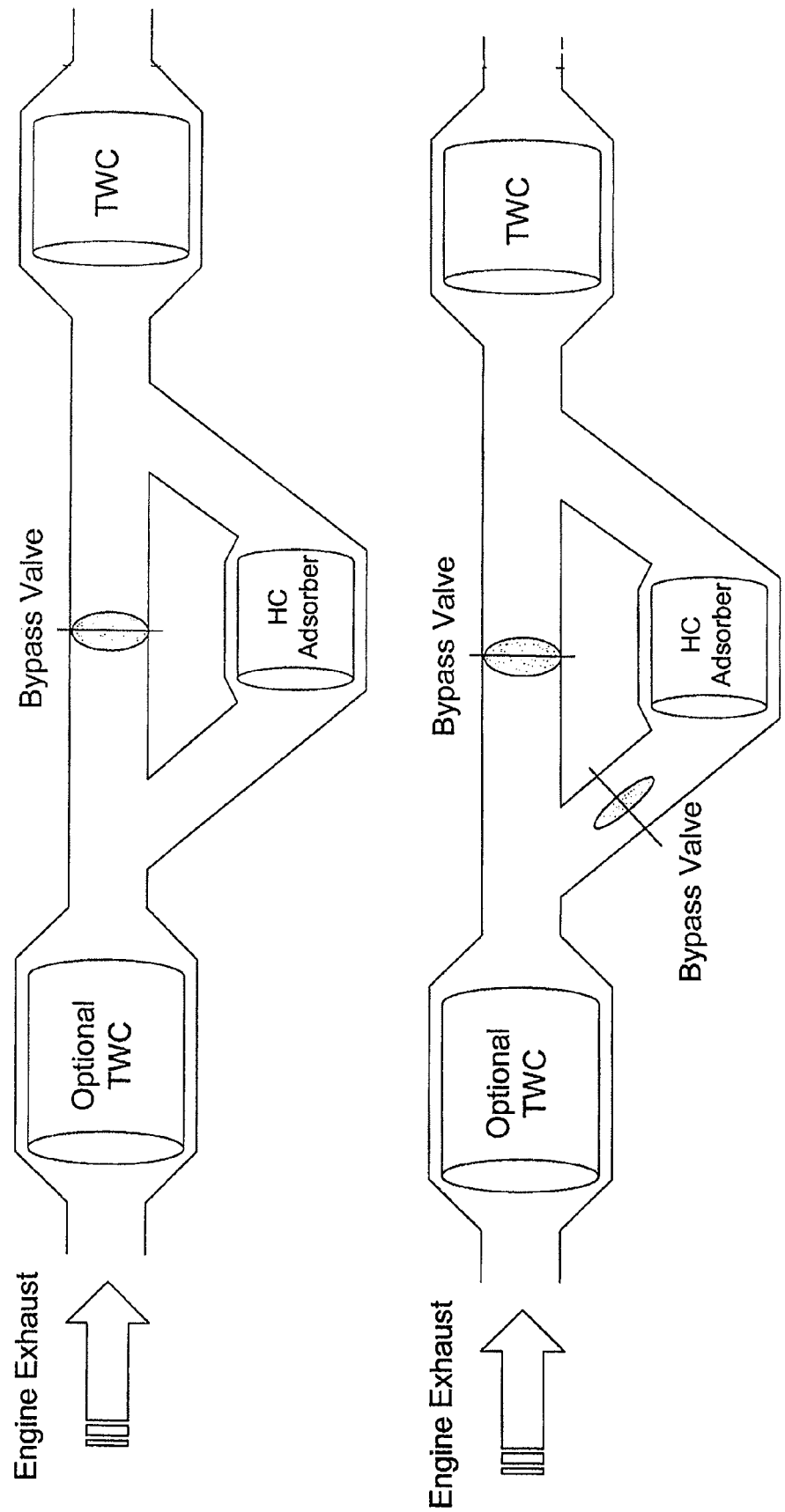
FIG. 2 illustrates alternative valve and component configurations for off-line HC adsorber applications; which can be used according to the invention.
Figure 2A:
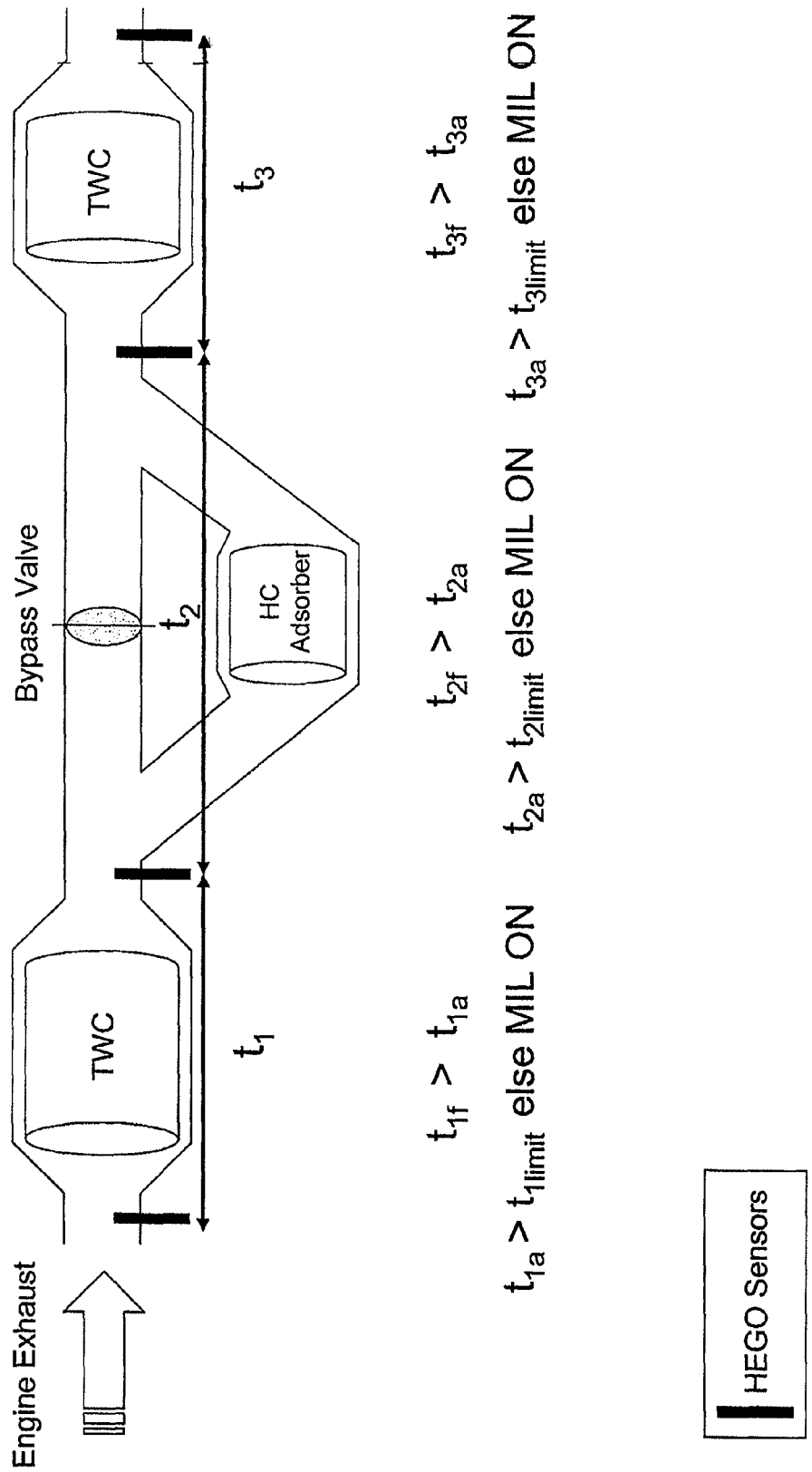
Figure 2B:
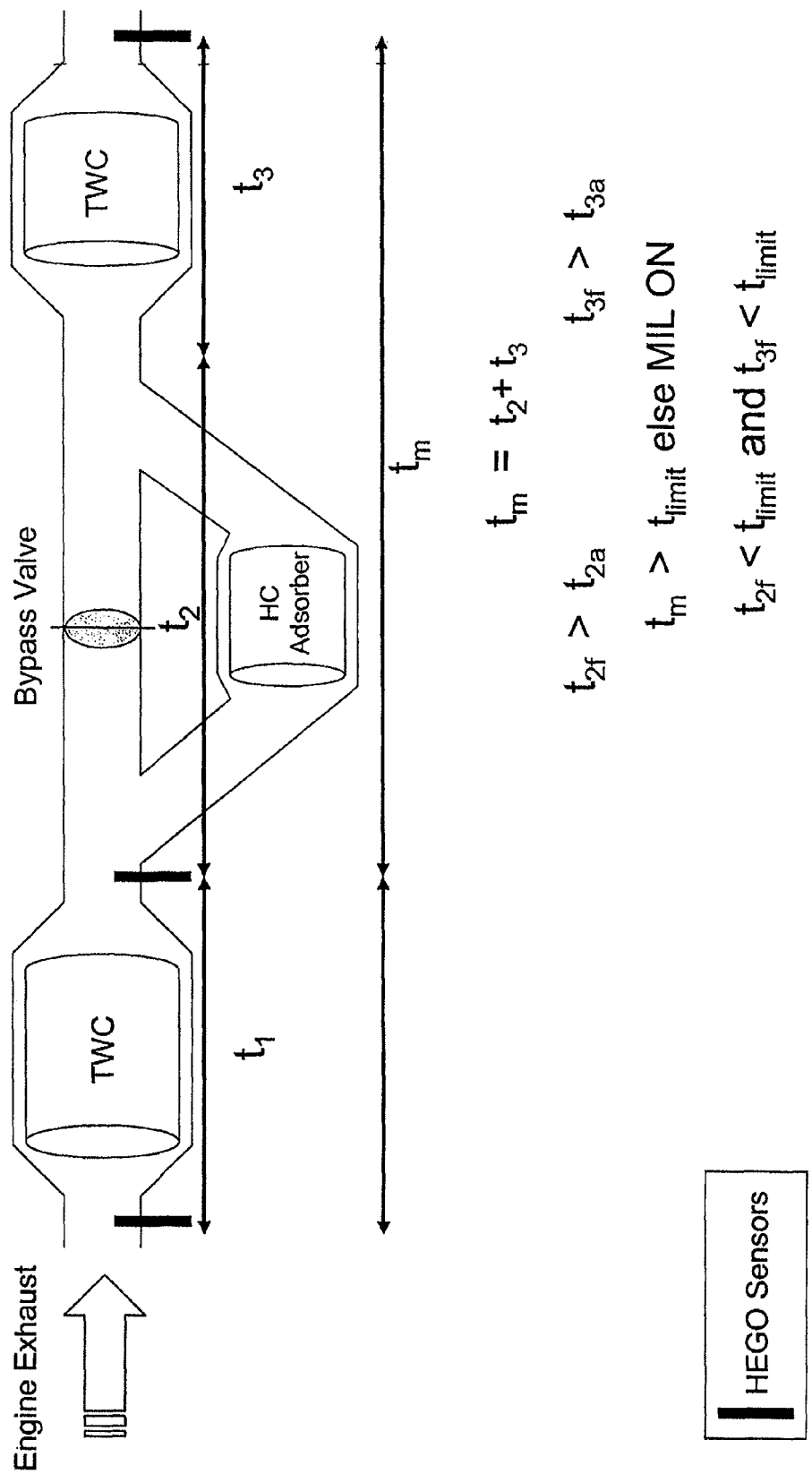

Configurations for systems incorporating off-line HC adsorbers are illustrated in FIG. 2. The illustrated designs differ in whether the HC adsorber can be isolated from exhaust flow at any time during operation. This requires an additional bypass valve. In either case, an optional TWC can be placed upstream of the bypass. FIG. 2A illustrates the placement of sensors in the bypass systems. By incorporating four sensors, each component can be diagnosed individually in a manner analogous to that of the in-line components. As depicted in FIGS. 2B and 2C, two of the three individual components can be diagnosed together by measuring a composite delay time, $t_m$. Again, constraints on delay time of the fresh component relative to the limiting delay time are required to address the potential for missing components. Depending upon a variety of system considerations, including the relative sizing of the upstream and downstream TWC, the OSC content of each component, and relative temperatures during diagnostic measurements, may influence the choice of configuration. By making measurements with and without the HC adsorber bypassed, it is also possible to determine by difference the effective delay time associated with each individual component. In this way the requirement that the delay time for a fresh individual component being less than the limiting delay time associated with a composite measurement is removed.

It is envisioned that a variety of base metal ions (or combinations) such as Cu, Fe, Mn, Ce, Pr, etc. may be able to change oxidation state, and as a result, upon exchange in the zeolite pore, support pore system diagnosis, and ultimately allow the OBD characterization of a HC adsorber. It is envisioned that these base metals may be used singly, in combination, or in conjunction with precious metals.

The metal-incorporated zeolite and associated diagnostic can be effectively utilized in in-line and off-line (or bypass) HC adsorber configurations.

The metal-incorporated zeolite and associated diagnostic can be effectively utilized in HC adsorbents incorporated within catalysts formulated as TWCs, diesel oxidation catalysts, lean NOx catalysts, NOx adsorbers, selective catalytic reduction catalysts, or other emission catalysts. Conversely, the metal-incorporated zeolite and associated diagnostic can be effectively utilized in components whose sole function is that of a HC adsorber.

The metal-incorporated zeolite can be incorporated homogeneously throughout the catalyst formulation. Conversely, the metal-incorporated zeolite can be incorporated in one or more layer of a multilayer catalyst formulation.

The metal-incorporated zeolite can be incorporated within a single zone or within multiple zones of an axially or radially zoned component.

A zone, layer, or adsorbing component can comprise one or more appropriate metals exchanged within one or more zeolitic materials.

HC Adsorber Preparation

HCA1 was prepared by dissolving 21.3 g of cupric nitrate and 3 g of ammonium dihydrogen phosphate in 1000 g of water. This solution was added with stirring to a slurry of 139.7 g of ZSM-5 zeolite and 46.6 g of beta zeolite. After mixing for 15 minutes, 14 g of a silica sol was added and mixing continued for 15 additional minutes. The resultant slurry was applied to a cordierite substrate with 400 cells per square inch and a wall thickness of 4 mil yielding a final washcoat loading of 125 g/L following calcination.

HCA2 was prepared by slurrying 100 g of ZSM-5 zeolite exchange sith 5% Fe and [b] g of beta zeolite, exchange with 3% Fe in 1000 g of water. After mixing for 15 minutes, 15 g of a silica sol was added and mixing continued for 15 additional minutes. The resultant slurry was applied to a cordierite substrate with 400 cells per square inch and a wall thickness of 4 mil yielding a final washcoat loading of 125 g/L following calcination.

Engine Tests:

Following canning using conventional measures to place the zeolite material into a converter, each HC adsorber sample was evaluated in the exhaust of a stoichiometric gasoline engine following preconditioning for 20 minutes at 500° C. Exhaust flow was adjusted to a rate of 5 g/sec. Lean/rich and rich lean switch times were then measured sequentially at 450° C. using air/fuel offsets of 5% above and below the stoichiometric ratio. Results are shown in FIG. 3 which indicate that samples HCA1 and HCA2 each undergo lean-to-rich and rich-to-lean signals which could be used as the basis for an emission control system diagnostic strategy.

The OSC switch test is performed on an engine dynamometer by stepping the engine exhaust lambda between a single lean value of 1.05 and a single rich value of 0.95 every 15 second, until ten data points are achieved for each switching direction.

FIG. 4 shows the exhaust lambda before and after the adsorber, during one 60 second period, in which one lean-to-rich and one rich-to-lean delay time value are collected. Standard non-linear heated exhaust gas oxygen (HEGO) sensors are placed before and after the adsorber $t_{l>r}$ and $t_{>rl}$ represents the difference in time between when the HEGO sensor in front of and behind the adsorber cross a lambda value of 1 or 450 mV as represented by the output voltage of the HEGO sensor.

The specific engine conditions for this test are as follows:

| | |
|---|---|
| Engine speed: | 1700 RPM |
| Intake air flow: | 41 g/s |
| Flow through adsorber: | 5.34 g/s (reference lambda 1) |
| Inlet temperature: | 450° C. |
| Fuel: | EEE certification w/20 ppm sulfur |

Further variations and modifications will be apparent to those skilled in the art from the foregoing and are intended to be encompassed by the claims appended hereto.

The invention claimed is:

1. A method for diagnosing the state of a device for storing hydrocarbons in an exhaust emission control system comprising:
   providing an FTC adsorbent, which is a molecular sieve containing a plurality of micropores having one or more reactive base metals incorporated therein, in an exhaust gas conduit;
   passing an exhaust gas composition in contact with said molecular sieve;
   detecting any blockage of said micropores by determining extent of hydrocarbon storage capacity by measuring changes in controlled lean/rich switching times between a set of oxygen sensors located in said exhaust emission control system;
   adjusting the exhaust gas composition to a fuel lean condition;
   measuring signals from a first oxygen sensor located before the HC adsorbent and a second oxygen sensor located after the HC adsorbent, determining if said signals are equivalent;
   if the signals are equivalent, adjusting the exhaust gas composition to a fuel rich condition, as the exhaust gas composition in the fuel rich condition passes the oxygen sensors, measuring a signal from the first oxygen sensor;
   determining elapsed time between sensing a fuel rich condition at the first and second oxygen sensor, subtracting the time for the exhaust gas composition to flow from said first oxygen sensor to the second oxygen sensor to determine delay time;
   comparing the determined delay time with that of a threshold part to assess minimum functionality of the HC adsorbent;
   if the functionality of the FIC adsorbent is determined to be insufficient, adjusting engine controls as necessary to heat and purge any accumulated hydrocarbon or other deposits filling or blocking the micropores of the molecular sieve to give a purged FIC adsorbent;
   repeating delay time measurements to reassess the functionality of the purged HC adsorbent;

if the functionality of the HC adsorbent or the purged HC adsorbent is determined to be sufficient, returning to normal operation;

if the functionality of the purged HC adsorbent is determined to be insufficient, activating a malfunction signal.

2. The method of claim 1, wherein a warning of system failure is by activation of a visual signal.

3. The method according to claim 1, wherein a warning of system failure is by activation of an audible signal.

4. The method according to claim 1, wherein the one or more reactive base metals are selected from the group consisting of Cu, Fe, Mn, Ce, Pr, and mixtures thereof.

5. A method for diagnosing the state of a device for storing hydrocarbons in an exhaust emission control system comprising:

providing an FIC adsorbent, which is a molecular sieve containing a plurality of micropores having one or more reactive base metals incorporated therein, in an exhaust gas conduit;

passing an exhaust gas composition in contact with said molecular sieve;

detecting any blockage of said micropores by determining extent of hydrocarbon storage capacity by measuring changes in controlled rich/lean switching times between a set of oxygen sensors located in said exhaust emission control system;

adjusting the exhaust gas composition to a fuel rich condition;

measuring signals from a first oxygen sensor located before the ITIC adsorbent and a second oxygen sensor located after the HC adsorbent, determining if said signals are equivalent;

if the signals are equivalent, adjusting the exhaust gas composition to a fuel lean condition, as the exhaust gas composition in the fuel lean condition passes the oxygen sensors, measuring a signal from the first oxygen sensor;

determining elapsed time between sensing a fuel lean condition at the first and second oxygen sensors, subtracting the time for the exhaust gas composition to flow from said first oxygen sensor to the second oxygen sensor to determine delay time;

comparing the determined delay time with that of threshold part to assess minimum functionality of the HC adsorbent;

if the functionality of the HC adsorbent is determined to be insufficient, adjusting engine controls as necessary to heat and purge any accumulated hydrocarbon or other deposits filling or blocking the micropores of the molecular sieve to give a purged HC adsorbent;

repeating delay time measurements to reassess the functionality of the purged HC adsorbent;

if the functionality of the HC adsorbent or the purged HC adsorbent is determined to be sufficient, returning to normal operation;

if the functionality of the purged HC adsorbent is determined to be insufficient, activating a malfunction signal.

6. The method of claim 5, wherein a warning of system failure is by activation of a visual signal.

7. The method according to claim 5, wherein a warning of system failure is by activation of an audible signal.

8. The method according to claim 5, wherein the one or more reactive base metals are selected from the group consisting of Cu, Fe, Mn, Ce, Pr, and mixtures thereof.

\* \* \* \* \*